United States Patent
Ariyuki et al.

(10) Patent No.: US 12,209,187 B2
(45) Date of Patent: Jan. 28, 2025

(54) AMORPHOUS SILICA-TITANIA COMPOSITE OXIDE POWDER, RESIN COMPOSITION, LIQUID DISPERSION, AND METHOD FOR PRODUCING SILICA-COATED SILICA-TITANIA COMPOSITE OXIDE POWDER

(71) Applicant: TOKUYAMA CORPORATION, Yamaguchi (JP)

(72) Inventors: Masao Ariyuki, Yamaguchi (JP); Osamu Tanaka, Yamaguchi (JP); Kazuhiro Fukunaga, Yamaguchi (JP); Mari Aoki, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 706 days.

(21) Appl. No.: 17/618,078

(22) PCT Filed: Jun. 5, 2020

(86) PCT No.: PCT/JP2020/022221
§ 371 (c)(1),
(2) Date: Dec. 10, 2021

(87) PCT Pub. No.: WO2020/250813
PCT Pub. Date: Dec. 17, 2020

(65) Prior Publication Data
US 2022/0315767 A1 Oct. 6, 2022

(30) Foreign Application Priority Data
Jun. 12, 2019 (JP) .................. 2019-109385

(51) Int. Cl.
C09C 1/00 (2006.01)
C08K 9/02 (2006.01)
C09C 3/06 (2006.01)

(52) U.S. Cl.
CPC .............. *C09C 1/0087* (2013.01); *C08K 9/02* (2013.01); *C09C 3/063* (2013.01); *C01P 2002/02* (2013.01); *C01P 2004/61* (2013.01); *C01P 2004/62* (2013.01); *C01P 2004/84* (2013.01); *C08K 2201/005* (2013.01)

(58) Field of Classification Search
CPC ..... C09C 1/0087; C08K 9/02; C01P 2004/61; C01P 2004/62
See application file for complete search history.

(56) References Cited

U.S. PATENT DOCUMENTS

| | | |
|---|---|---|
| 2003/0133890 A1 | 7/2003 | Kato et al. |
| 2003/0232149 A1 | 12/2003 | Oswald et al. |
| 2004/0229040 A1 | 11/2004 | Kudo et al. |
| 2006/0147366 A1 | 7/2006 | Kogoi et al. |
| 2011/0262750 A1 | 10/2011 | Taima |
| 2012/0121804 A1* | 5/2012 | Sekino .................. A61K 6/818 427/215 |

FOREIGN PATENT DOCUMENTS

| | | |
|---|---|---|
| CN | 1732129 A | 2/2006 |
| JP | 62-089701 | 4/1987 |
| JP | 06-065475 | 3/1994 |
| JP | 06-254383 | 9/1994 |
| JP | 07-309616 | 11/1995 |
| JP | 8-040707 | 2/1996 |
| JP | 10-226513 | 8/1998 |
| JP | 2003-252616 | 9/2003 |
| JP | 2004-338969 | 12/2004 |
| JP | 3647959 B2 * | 5/2005 |
| JP | 2006-052128 | 2/2006 |
| JP | 2007-269594 | 10/2007 |
| JP | 2007-269612 | 10/2007 |
| JP | 5701087 B2 | 4/2015 |
| WO | WO 2007/116803 A1 | 4/2006 |
| WO | WO 2011/016418 | 2/2011 |

OTHER PUBLICATIONS

Machine translation of JP-2006052128-A obtained from WIPO Patentscope (Year: 2006).*
Machine translation of JP-3647959-B2 from IP.com (Year: 2005).*
Extended European Search Report for 20822825.4, mailed May 25, 2023, 9 pages.
Written Opinion for PCT/JP2020/022221 and its English translation, mailed Aug. 11, 2020, 3 pages.
International Search Report for PCT/JP2020/022221 and its English translation, mailed Aug. 11, 2020, 3 pages.

* cited by examiner

*Primary Examiner* — Kregg T Brooks
*Assistant Examiner* — David R. Foss
(74) *Attorney, Agent, or Firm* — Casimir Jones, S.C.; Robert A. Goetz

(57) ABSTRACT

Amorphous silica-titania composite oxide powder is powder untreated with a surface treatment agent and consisting of amorphous silica-titania composite oxide particles, wherein: a refractive index at a measurement wavelength of 589 nm is not less than 1.46; a volume-based cumulative 50% diameter is 0.1 μm to 2.0 μm; and a content of particles having a particle size of not less than 5.0 μm is not more than 10 ppm, and wherein, in a case where the powder is dried in an atmospheric air at 110° C. for 12 hours, and powder thus dried is stored for 24 hours at a temperature of 25° C. and a relative humidity of 85% so as to absorb moisture, a water absorption rate is not more than 0.8% by mass as calculated from a mass X before moisture absorption and a mass Y after the moisture absorption in accordance with the formula: $(Y-X)/X \times 100$.

5 Claims, No Drawings

AMORPHOUS SILICA-TITANIA COMPOSITE OXIDE POWDER, RESIN COMPOSITION, LIQUID DISPERSION, AND METHOD FOR PRODUCING SILICA-COATED SILICA-TITANIA COMPOSITE OXIDE POWDER

TECHNICAL FIELD

The present invention relates to amorphous silica-titania composite oxide powder which has extremely low water absorbency and a reduced amount of coarse particles and which can be suitably used as a filler of a resin adhesive, a hard coating material, an anti-blocking agent for a film, and the like. The present invention also relates to a method for producing the amorphous silica-titania composite oxide powder.

BACKGROUND ART

Filling a resin adhesive or an organic polymer material for a film and the like with inorganic powder provides effects such as improved properties (e.g., mechanical strength) of a resin or antiblocking properties of the film, and thus has been the subject of various studies and applied to various uses. Studies have been conducted also on methods for controlling optical properties such as transparency by controlling a difference in refractive index between an organic polymer material and inorganic powder.

For example, Patent Literature 1 proposes matching a refractive index of an epoxy resin composition as an organic polymer material with a refractive index of inorganic composite oxide powder as an inorganic powder, so as to control a thermal expansion coefficient of an epoxy resin while maintaining transparency.

Methods for adjusting a refractive index of inorganic powder include a method of changing a ratio of different types of metal oxides which are mixed together and differ in refractive index. Various methods for obtaining such refractive index-adjusted particles have been studied. According to a proposal (Patent Literature 2), particularly with silica-based, spherical composite oxide particles which have been produced by sol-gel method and have a narrow particle size distribution, filling an organic polymer material with the particles yields a product that is excellent not only in terms of mechanical strength but also in terms of a smooth and shiny surface and good appearance. Patent Literature 3 discloses a method for producing fine metal oxide particles by hydrolyzing an organic metal compound.

CITATION LIST

Patent Literature

[Patent Literature 1]
Japanese Patent Application Publication, Tokukaihei, No. 6-65475
[Patent Literature 2]
Japanese Patent Application Publication, Tokukaisho, No. 62-89701
[Patent Literature 3]
Japanese Patent Application Publication, Tokukaihei, No. 6-254383

SUMMARY OF INVENTION

Technical Problem

In a case where a transparent resin adhesive or an organic polymer material for use in a transparent film and the like is filled with inorganic powder which has an adjusted refractive index and high water absorbency, the transparency of a resin cured product may deteriorate with use or the mechanical strength of the resin cured product may decrease. Further, also in a case where a large amount of coarse particles or aggregations are contained in the inorganic powder, not only the transparency of a resin cured product may be deteriorated but also the fluidity of the resin may decrease to cause a defect, such as a void, in the resin cured product or a damage on another member when the resin flows. Particularly for a film for optical applications, it has become important, in recent years, for inorganic powder to have reduced water absorbency and a minimum amount of coarse particles or aggregations, as flat panel displays have an increasingly larger size, higher definition, and higher resolution.

However, silica-titania composite oxide particles produced by sol-gel method have higher water absorbency than silica particles. The water absorbency can be reduced to some extent by increasing a firing temperature in production of silica-titania composite oxide particles. However, in the step of firing at a high temperature, coarse particles tend to be formed by sintering, and an excessively high temperature may cause crystals to precipitate. As such, no powder has been obtained which has sufficiently low water absorbency and a reduced amount of coarse particles.

As a method for reducing the intrinsically high water absorbency of silica-titania composite oxide particles, Patent Literature 1 discloses a method of coating particle surfaces with silica. However, further improvement of inorganic powder is awaited due to increasingly demanding requirements for various properties in recent years.

An aspect of the present invention has an objective of providing amorphous silica-titania composite oxide powder which, when a resin or the like is filled with the amorphous silica-titania composite oxide powder for use, makes it possible to reduce a decrease in transparency of a resin cured product over time and reduce a defect in the resin cured product, in comparison to existing silica-titania composite oxide particles.

Solution to Problem

The inventors of the present invention conducted diligent research in order to attain the objective. As a result, the inventors found that, in the foregoing technology of coating surfaces of silica-titania composite oxide particles with silica, in a case where conditions under which the coating is carried out is controlled to fall within specific ranges, amorphous silica-titania composite oxide powder makes it possible to reduce, when a resin or the like is filled with the amorphous silica-titania composite oxide powder for use, a decrease in transparency of a resin cured product over time and a defect in the resin cured product, in comparison to existing silica-titania composite oxide particles. On the basis of the finding, the inventors completed the present invention.

That is, an aspect of the present invention is powder which is amorphous silica-titania composite oxide powder untreated with a surface treatment agent and consisting of amorphous silica-titania composite oxide particles,
wherein:
a refractive index of the particles as measured by immersion method at a measurement wavelength of 589 nm is not less than 1.46;
a volume-based cumulative 50% diameter as measured by laser diffractometry is in a range of 0.1 μm to 2.0 μm; and a content of particles having a particle size of not less than 5.0 μm is not more than 10 ppm as measured by Coulter counter method, and wherein, in a case where the silica-titania composite oxide powder is dried in an atmospheric air at 110° C. for 12 hours, and powder thus dried is stored for 24 hours under conditions of a temperature of 25° C. and a relative humidity of 85% so as to absorb moisture, a water absorption rate is not more than 0.8% by mass as calculated from a change in mass in accordance with the following formula:

water absorption rate=$(Y-X)/X \times 100$ where X is a mass before moisture absorption, and Y is a mass after the moisture absorption.

Advantageous Effects of Invention

Amorphous silica-titania composite oxide powder in accordance with an aspect of the present invention, when a resin or the like is filled with the amorphous silica-titania composite oxide powder for use, makes it possible to reduce a decrease in transparency of a resin cured product over time and reduce a defect in the resin cured product, in comparison to existing silica-titania composite oxide particles.

DESCRIPTION OF EMBODIMENTS

An aspect of the present invention is powder (which may be hereinafter referred to simply as "powder of the present invention") untreated with a surface treatment agent and consisting of amorphous silica-titania composite oxide particles.

The powder of the present invention has not been treated with a surface treatment agent. Generally, it is possible to reduce water absorbency by carrying out a treatment with a hydrophobic surface treatment agent (e.g., introduction of a trimethylsilyl group). The powder of the present invention, despite not being subjected to such a surface treatment, exhibits a good low water absorption rate (described later) and thus is an unconventional, entirely new silica-titania composite oxide powder.

Due to not being treated with a surface treatment agent, the powder ordinarily has, for example, a carbon content much lower than 0.005% by mass.

In the present invention, amorphousness is recognized if, in X-ray diffractometry, only a broad halo pattern is present without sharp peaks attributable to a crystalline periodic array structure.

The powder of the present invention consists of silica ($SiO_2$) and titania ($TiO_2$). Elements constituting the powder (particles) can be confirmed by X-ray fluorescence analysis or the like.

The powder of the present invention is such that a refractive index of the particles at a measurement wavelength of 589 nm is not less than 1.46. The refractive index is determined on the basis of immersion method such that a refractive index of a liquid at a measurement temperature of the liquid, from which liquid a particle dispersion having the highest transmittance (lowest absorbance) is prepared, is considered the refractive index of the powder (particles). Refractive indices of liquids for dispersion used in the measurement can be caused to vary by a change in composition or by a change in temperature. Note here that a refractive index of a silica-titania composite oxide is virtually unchanged within a temperature range that can be measured by immersion method.

Although a refractive index of silica consisting of a single element at a measurement wavelength of 589 nm cannot be generally defined because the refractive index varies depending on, for example, a firing temperature at which the particles of silica are produced, the refractive index is approximately 1.45 in a case where, for example, the particles are prepared by a sol-gel method using alkoxide as a raw material and fired at 900° C. In contrast, amorphous silica-titania composite oxide powder in accordance with an aspect of the present invention has a higher refractive index due to an effect of titania contained in the amorphous silica-titania composite oxide powder.

The powder of the present invention is such that the particles have a refractive index of preferably 1.46 to 1.65, more preferably 1.48 to 1.60, so that, when the powder is complexed with various resins, a good transparency can be easily achieved by matching the refractive index of the particles with refractive indices of the various resins.

The powder of the present invention is such that the above refractive index can be adjusted mainly by a ratio of silica and titania. That is, generally, the higher a ratio of titania, the higher the refractive index. In terms of obtaining a refractive index in the above range, the ratio of silica and titania is preferably such that a lower limit of the ratio of titania is not less than 1 mol %, assuming that a sum of silica and titania is 100 mol %. Further, by setting an upper limit of the ratio of titania to not more than 25 mol %, spherical particles independent of each other can be easily produced, and the range of the refractive index can be made close to the ranges of the refractive indices of many resins. Thus, setting the upper limit of the ratio of titania to not more than 25 mol % is preferable in order to make use of optical transparency.

Further, having the ratio in this range makes it easy to complex silica and titania at an atomic level and form an amorphous state, and thus is advantageous also in terms of manufacture. Whether or not silica and titania are complexed at an atomic level can be confirmed by infrared spectroscopy or the like, on the basis of whether or not a Si—O—Ti bond is present. When silica and titania are phase-separated from each other, crystallization of titania easily proceeds, so that it is difficult to form an amorphous state.

A content rate of titania is preferably not more than 20 mol %, and more preferably not more than 15 mol %. The content rate of titania is also preferably not less than 3 mol %, and more preferably not less than 5 mol %.

The refractive index slightly changes depending on a temperature of firing carried out in manufacturing. If the other conditions are the same, the higher the firing temperature, the higher the refractive index.

The powder of the present invention has a volume-based cumulative 50% diameter (hereinafter referred to as "average particle size") of 0.1 μm to 2 μm as measured by laser diffractometry. The measurement is carried out with respect to a liquid obtained by adding the powder to pure water in an amount equivalent to 0.25% by mass and ultrasonically dispersing the powder at an output of 40 W and for an irradiation time of 10 minutes. In a case where the average particle size is smaller than 0.1 μm, particles after drying and firing tend to aggregate. This makes it difficult to crush the particles, and thus increases coarse particles having a particle size of not less than 5 μm. Also in a case where the particles are too large, it is difficult to reduce aggregations with high accuracy, so that particles having a particle size of not less than 5 μm increase. For this reason, a more preferable particle size is such that the average particle size is in a range of 0.2 µm to 2 µm, and particularly preferably in a range of 0.4 µm to 1.5 µm.

When a particle size distribution is wide, coarse particles tend to be produced. As such, the powder of the present invention preferably has high monodispersity. Specifically, a coefficient of variation calculated from a ratio of particles with respective particle sizes measured by the above method is preferably not more than 35%, more preferably not more than 25%, and particularly preferably not more than 20%. Typically, the coefficient of variation is not less than 10%.

Shapes of individual particles are not particularly limited, but are preferably spherical in view of the aesthetics of an organic polymer molded article filled with the inorganic particles. The spherical shape may be such that substantially all particles that can be visually recognized can be recognized as spheres (circles) when observed by an electron microscope or the like.

The powder of the present invention is such that a content of particles having a particle size of not less than 5.0 µm is not more than 10 ppm as measured by Coulter counter method. More specifically, in an ultrasonic dispersion liquid (power: 40 W, irradiation time: 10 minutes) containing 5% by mass of the powder, a ratio of the number of coarse particles of not less than 5 µm to the total number of measured particles as determined by Coulter counter method (aperture diameter: 30 µm) is not more than 10 ppm, and even more preferably not more than 5 ppm. At this time, distilled water is used as a dispersion medium.

The particles having a particle size of not less than 5.0 µm may be single particles, but are generally aggregates or sintered particles formed in a manufacturing process.

The powder of the present invention is substantially free of coarse particles (particles of not less than 5.0 µm) due to ultrasonic dispersion as described above, that is, contains substantially no strong aggregates that do not disperse upon ultrasonic irradiation and contains only weak aggregates that are easily dispersed, or the powder of the present invention contains no aggregates at all. As such, when the powder is dispersed in, for example, a resin or the like and used, it is often possible to sufficiently disperse the powder by imparting, for example, shear of a generally used dispersing device.

The powder of the present invention is such that, in a case where the powder is dried in an atmospheric air at 110° C. for 12 hours, and powder thus dried is stored for 24 hours under conditions of a temperature of 25° C. and a relative humidity of 85% so as to absorb moisture, a water absorption rate is not more than 0.8% by mass, more preferably not more than 0.5% by mass, and particularly preferably not more than 0.3% by mass as calculated from a change in mass in accordance with the following formula:

water absorption rate=$(Y-X)/X \times 100$ where X is a mass before moisture absorption, and Y is a mass after the moisture absorption.

The amorphous silica-titania composite oxide powder has extremely low water absorbency even under a high-humidity condition. As such, after the amorphous silica-titania composite oxide powder is complexed with a resin or the like, optical properties and the like little change by water absorption.

In terms of easily exhibiting the various physical properties described above, the powder of the present invention is preferably such that a core consisting of the silica-titania composite oxide is coated with silica. In other words, the powder of the present invention preferably includes a core consisting of the silica-titania composite oxide and a silica coating layer consisting of silica. As a thickness of the silica coating layer increases, the water absorption rate tends to decrease. However, when the thickness is excessively large, optical scattering occurs because an effect of a difference between a refractive index of the silica coating layer and a refractive index of the core becomes more significant. In terms of easily maintaining transparency at a high level after the powder is complexed with a resin or the like, it is preferable that the thickness of the silica coating layer be approximately not more than 30 nm. In a case where the thickness of the silica coating layer is not more than 30 nm, generally, a dispersion liquid, in which the powder is dispersed in an amount of 2% by mass in a solvent having a refractive index that matches the refractive index of the powder, has an absorbance of less than 0.05, so that good transparency is achieved when the powder is complexed with a resin or the like. The thickness of the silica coating layer is more preferably not more than 20 nm, and even more preferably not more than 15 nm. From the viewpoint of easily obtaining an effect of coating, the thickness of the silica coating layer is preferably not less than 3 nm, and preferably not less than 5 nm. Of course, in a case where the powder includes such a silica coating layer, the foregoing content ratio of titania is a value calculated taking account of the silica constituting the silica coating layer.

By forming such a silica coating layer, the particle hardness measured by a microcompression test is higher than that in a case where the coating layer is not formed.

The present invention also provides surface-treated amorphous silica-titania composite oxide powder in which the foregoing amorphous silica-titania composite oxide powder has been treated with a surface treatment agent. Surface-treating improves affinity with a resin used when the surface-treated amorphous silica-titania composite oxide powder is complexed with the resin or the like, or also makes it possible to control hydrophobicity, electrical properties, and the like.

As the surface treatment agent used, a known silylating agent or a known silane coupling agent typically used in surface treatment can be used without any particular restriction. Depending on the required characteristics and the like of the surface-treated powder, the surface treatment agent can be selected as appropriate from these examples and used.

Specific examples of the silane coupling agent include, for example, methyltrimethoxysilane, methyltriethoxysilane, hexyltrimethoxysilane, decyltrimethoxysilane, phenyltriethoxysilane, vinyltrimethoxysilane, vinyltriethoxysilane, 3-methacryloyloxypropyltrimethoxysilane, 3-methacryloyloxypropyltriethoxysilane, 3-acryloyloxytrimethoxysilane, 3-glycidoxypropyltrimethoxysilane, 3-glycidoxypropyltriethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, N,N-dimethyl-3-aminopropyltrimethoxysilane, N,N-diethyl-3-aminopropyltrimethoxysilane, and 4-styryltrimethoxysilane.

Examples of the silylating agent include tetramethyldisilazane, hexamethyldisilazane, and heptamethyldisilazane.

Further, it is also possible to carry out the surface treatment with use of various silicone oils, a titanate-based coupling agent, an aluminate-based coupling agent, or the like.

Further, the powder may be surface-treated with a plurality of different surface treatment agents.

The powder treated with a surface treatment agent may be highly hydrophobic and may not be dispersed in water. In order to measure a particle size of such powder, ethanol may be used instead of water.

The amorphous silica-titania composite oxide powder in accordance with an aspect of the present invention can be complexed with a resin or the like and used, and can be used as an alternative for various known metal oxides. As described above, the amorphous silica-titania composite oxide powder has extremely low water absorbency, so that a molded article does not undergo a change in transparency over time. Also as described above, the amorphous silica-titania composite oxide powder does not contain coarse particles, so that an excellent fluidity is exhibited when a resin is filled with the amorphous silica-titania composite oxide powder. Therefore, the amorphous silica-titania composite oxide powder can be suitably used for filling a resin composition for an electronic material.

Further, the amorphous silica-titania composite oxide powder in accordance with an aspect of the present invention, in comparison to existing silica-titania composite oxide particles, makes it possible to increase the mechanical strength of a resin composition while maintaining the transparency of a molded article. Thus, the amorphous silica-titania composite oxide powder is also suitable for use as a hard coating material or the like. Furthermore, the amorphous silica-titania composite oxide powder in accordance with an aspect of the present invention, in comparison to existing silica-titania composite oxide particles, does not undergo a change in transparency over time and is free of a defect resulting from coarse particles. Thus, the amorphous silica-titania composite oxide powder is also suitable for use in high-resolution optical films of recent years.

The amorphous silica-titania composite oxide powder in accordance with an aspect of the present invention, when a resin or the like is filled with the amorphous silica-titania composite oxide powder for use, makes it possible to reduce a decrease in transparency of a resin cured product over time and reduce a defect in the resin cured product, in comparison to existing silica-titania composite oxide particles. Further, the amorphous silica-titania composite oxide powder in accordance with an aspect of the present invention, in comparison to existing silica-titania composite oxide particles, makes it possible to reduce a decrease in water absorbency of a resin cured product and thus reduce a decrease over time in mechanical strength of the resin cured product resulting from water absorption.

A resin with which the amorphous silica-titania composite oxide powder in accordance with an aspect of the present invention is mixed is not limited to any particular type. The type of the resin may be selected as appropriate depending on the desired application, and examples of a resin that can be selected include epoxy resin, acrylic resin, silicone resin, polyester resin, and olefinic resin.

For example, for use in a semiconductor sealing material, the resin is preferably epoxy resin, acrylic resin, silicone resin, or the like. For use in a film, the resin is preferably triacetyl cellulose resin, olefinic resin (polypropylene, polyethylene, or the like), polyethylene terephthalate resin, or the like.

An amount of the amorphous silica-titania composite oxide powder with which a resin composition is filled may be adjusted as appropriate according to the application and purpose of the resin composition. Specifically, the amorphous silica-titania composite oxide powder is preferably in a range of 30 parts by mass to 90 parts by mass with respect to 100 parts by mass of the resin in a case where the resin composition is for use in a semiconductor sealing material, and preferably in a range of 0.01 parts to 10 parts by mass with respect to 100 parts by mass of the resin in a case where the resin composition is for use in a film. The resin composition may contain another filler as well as the amorphous silica-titania composite oxide powder in accordance with an aspect of the present invention.

Further, depending on the application and the like, the amorphous silica-titania composite oxide powder may be dispersed in water or an organic solvent to obtain a dispersion liquid.

<<Method for Producing Amorphous Silica-Titania Composite Oxide Powder>>

The amorphous silica-titania composite oxide powder in accordance with an aspect of the present invention may be produced by any production method. However, according to the study of the present invention and the like, the amorphous silica-titania composite oxide powder can be produced by a method (hereinafter, referred to as "production method of the present invention") for producing silica-coated silica-titania composite oxide powder, including: forming a silica coating layer on surfaces of silica-titania composite oxide particles by gradually adding, to an alkaline aqueous dispersion liquid in which the silica-titania composite oxide particles are dispersed, an organic silicon compound capable of producing tetrahydroxysilane by hydrolysis; subsequently recovering particles from the liquid; and sintering the particles to obtain powder, wherein the method is carried out so as to satisfy the following (1) and (2):

(1) from a start to an end of addition of the organic silicon compound to the alkaline aqueous dispersion liquid, the following (a) and (b) are continuously carried out: (a) the organic silicon compound and a nitrogen-containing alkaline aqueous dispersion liquid are dropped simultaneously with and independently of each other while an amount of the organic silicon compound added is adjusted so that a change in water concentration in the alkaline aqueous dispersion liquid is not greater than ±1% by mass; and (b) a temperature is maintained at not lower than 40° C., and (2) a temperature during the sintering is not lower than 900° C.

The alkaline aqueous dispersion liquid (which may be hereinafter referred to simply as "aqueous dispersion liquid") in which the silica-titania composite oxide particles uncoated with silica are dispersed is preferably prepared by a method known as sol-gel method such that sol is produced by hydrolysis and polycondensation of metal alkoxide in a reaction medium, which consists of water containing a catalyst and an organic solvent, and the sol is gelated to form oxide particles.

As the above preparation method, a known method can be employed as appropriate. For example, methods described in Japanese Patent Application Publication, Tokukai, No. 2003-252616, Japanese Patent Application Publication, Tokukai, No. 2006-052128, Japanese Patent Application Publication, Tokukai, No. 2007-269594, Japanese Patent Application Publication, Tokukai, No. 2007-269612, Japanese Patent Application Publication, Tokukai, No. 2008-037700, Japanese Patent Application Publication, Tokukai, No. 2012-162438, etc. can be employed.

To briefly describe the method, first, a composite raw material is prepared by mixing a hydrolyzable organic silicon compound and a hydrolyzable organic titanium compound. A ratio of silica and titania in particles to be produced corresponds to a ratio of Si and Ti in the composite raw material. As such, the respective raw materials are mixed so that Si and Ti are in an intended ratio.

Subsequently, the composite raw material is added dropwise into an alkaline aqueous solution to grow silica-titania composite oxide particles by hydrolysis. Thus, a dispersion liquid in which grown silica-titania composite oxide particles are dispersed in an aqueous solvent can be obtained. A base for rendering an aqueous solution alkaline is preferably: an organic base such as various kinds of quaternary ammonium hydroxide or amines; or ammonia, and most preferably ammonia, from the viewpoint of cost or prevention of entering of impurities.

In the production method of the present invention, the aqueous dispersion liquid thus prepared, in which the silica-titania composite oxide particles are dispersed, is preferably used as it is to carry out a silica coating step described below.

The aqueous dispersion liquid in which the silica-titania composite oxide particles are dispersed is alkaline and has a pH of preferably 11 to 13. Further, in the aqueous dispersion liquid, a concentration of solid consisting of the silica-titania composite oxide is preferably approximately 5% by mass to 20% by mass, and a water concentration is preferably 5% by mass to 15% by mass. In preparation of the aqueous dispersion liquid by sol-gel method, the amounts of raw materials used are preferably adjusted to fall within these ranges. The dispersion liquid may contain an organic solvent such as alcohol.

In the production method of the present invention, an organic silicon compound capable of producing tetrahydroxysilane by hydrolysis is gradually added to the foregoing aqueous dispersion liquid to form a silica coating layer on surfaces of the silica-titania composite oxide particles. At this time, it is essential that (a) the organic silicon compound and a nitrogen-containing alkaline aqueous solution be dropped simultaneously with and independently of each other while an amount of the organic silicon compound added is adjusted so that a change in water concentration in the aqueous dispersion liquid is not greater than ±1% by mass; and (b) a temperature be maintained at not lower than 40° C.

If the conditions are not met, it is not possible to sufficiently reduce the water absorption rate. This is presumably because, when the conditions are not met, a silica coating on the surfaces of the silica-titania composite oxide particles is not uniform, and part of the surfaces is completely uncoated. Further, when the conditions are not met, aggregations tend to form, so that a ratio of coarse particles is very high.

This step of forming the silica coating layer will be discussed in detail below.

The organic silicon compound which is capable of producing tetrahydroxysilane by hydrolysis and is added to the aforementioned aqueous dispersion liquid can be a tetraalkoxide of silicon such as tetramethoxysilane and tetraethoxysilane. In a case where an alkoxide of silicon is a liquid at room temperature and under normal pressure, the alkoxide may be used as it is. From the viewpoint of preventing aggregation of particles, however, it is more preferable to use the alkoxide diluted with an organic solvent.

Typical examples of the organic solvent used in the dilution include alcohols such as methanol and ethanol. The amount of the organic solvent used is not particularly limited. Generally, the organic solvent is used in such an amount that the concentration of the organic silicon compound is 50% by mass to 90% by mass.

The amount of the organic silicon compound used is determined by calculation on the basis of a required amount of silica for causing the silica-titania composite oxide particles, which are dispersed in the aqueous dispersion liquid, to grow and have a silica coating layer of a desired thickness. The calculation is made on the assumption that the organic silicon compound is completely hydrolyzed into silica ($SiO_2$). The calculation is made also on the assumption that silica has a density of 2.20.

More specifically, the following indicates an example of a process of calculating a required amount of the organic silicon compound for achieving a predetermined thickness of the silica coating layer.

(1) A volume of silica-titania present in the aqueous dispersion liquid is calculated on the basis of a solid weight of the silica-titania composite oxide particles in the aqueous dispersion liquid (calculated assuming that the alkoxide is completely hydrolyzed into silica-titania) and a density of the silica-titania particles (calculated value: described later).

(2) A volume-based cumulative 50% diameter calculated by laser diffractometry is defined as a particle size (A), and the number of particles in the aqueous dispersion liquid is calculated from the particle size (A) and the volume of the silica-titania.

(3) From (i) a volume calculated from an assumed particle size (B) after completion of formation of a silica coating layer of a desired thickness, (ii) a volume calculated from the particle size (A), and (iii) the number of particles in the aqueous dispersion liquid calculated in (2), a total increase in volume due to the formation of the silica coating layer is calculated (Note: B=A+silica coating layer thickness×2).

(4) A required mass of silica is calculated from: the total increase in volume due to the formation of the silica coating layer; and the density of silica. A required mass of the organic silicon compound for forming silica of the required mass is calculated.

Note that the density of silica-titania used in the above calculation in (1) is calculated in accordance with a constitutional ratio of silica-titania (a ratio of raw materials used), on the assumption that amorphous silica ($SiO_2$) has a density of 2.20 and amorphous titania ($TiO_2$) has a density of 2.90. For example, in a case where a content rate of $TiO_2$ in silica-titania before the formation of the silica coating layer is 8 mol %, 2.20×0.92+2.90×0.08=2.26 may be used. According to the study of the present invention and the like, this calculated value substantially coincides with a measured value.

The above-described calculation of the amount of the organic silicon compound used is merely an example. The amount of the organic silicon compound used can be calculated by other calculation processes using the above density and the like.

A dropping rate at which the organic silicon compound is dropped into the aqueous dispersion solution needs to be slow such that substantially the entire hydroxysilane produced by hydrolysis undergoes a reaction on the surfaces of the silica-titania composite oxide particles so that the particles grow. The organic silicon compound can be dropped such that a growth rate of particle size is ordinarily approximately 10 nm to 100 nm per hour, and preferably approximately 10 nm to 60 nm per hour.

The growth rate of particle size is calculated as follows. A value obtained by multiplying a thickness of the silica coating layer by two was considered as the increase of the particle size by the silica coating. The increase was divided by a time for which a mixed solution of the organic silicon compound and the diluted organic solvent was dropped. In this manner, the particle size growth rate was easily calculated.

Growth rate of particle size=$Ds \times 2/T$ where Ds is the thickness of the silica coating layer (nm) and T is the time for which the mixed solution of the organic silicon compound and the diluted organic solvent was dropped.

In the production method of the present invention, a nitrogen-containing alkaline aqueous solution is added dropwise independently of and simultaneously with the organic silicon compound. As the organic silicon compound is added to the aqueous dispersion liquid, the organic silicon compound is gradually hydrolyzed. At this time, the hydrolysis consumes water in the aqueous dispersion liquid, so that a concentration of water gradually decreases. Further, basicity of the reaction system (the water dispersion liquid) needs to be maintained for hydrolysis and condensation. As such, in order to supplement the water concentration and the basicity, it is necessary to add the nitrogen-containing alkaline aqueous solution dropwise. It is in consideration of cost, entering of impurities, or the like that nitrogen-containing alkali such as ammonia, quaternary ammonium hydroxide or various amine compounds is used as the base.

The amount of the nitrogen-containing alkaline aqueous solution dropped is adjusted in accordance with (so as to be within ±1% by mass of) an amount of water consumed in a case where the organic silicon compound is completely hydrolyzed. The amount of water consumed is calculated from the amount (a rate at which the organic silicon compound is added) of the organic silicon compound dropped. The amount of the nitrogen-containing alkaline aqueous solution dropped is adjusted particularly preferably to fall within ±0.5% by mass.

In the production method of the present invention, water may be added separately from the nitrogen-containing alkaline aqueous solution in order to maintain a change in concentration of water in the aqueous dispersion liquid within ±1% by mass. However, from the viewpoint of simplifying the operation or control, it is preferable that the control of water be carried out only by controlling the amount of the nitrogen-containing alkaline aqueous solution dropped.

In order to obtain the powder of the present invention, it is also essential to maintain the temperature of the aqueous dispersion liquid at not lower than 40° C. during the dropping of the organic silicon compound and the nitrogen-containing alkaline aqueous solution. In a case where the temperature of the aqueous dispersion liquid is too low, a water absorption rate increases and coarse particles increase, so that the powder of the present invention cannot be obtained. This is presumably because, when the temperature of the aqueous dispersion liquid is too low, a reaction speed is decreased to cause aggregation of particles and gelation of the raw materials, so that formation of a uniform and dense silica coating layer is prevented. From the viewpoint of easily inhibiting the generation of silica single particles or aggregates, it is preferable to set the temperature of the aqueous dispersion liquid to not higher than 80° C., and particularly preferably not lower than 45° C. and not higher than 60° C.

In the production method of the present invention, after completion of the dropping of the organic silicon compound and the nitrogen-containing alkaline aqueous solution, an operation known as a maturation step of continuously stirring at a temperature approximately equal to a reaction temperature can be carried out in order for the reaction to reliably progress. A length of time for which the maturation is carried out is preferably 0.25 hours to 5 hours.

In the aqueous dispersion liquid after completion of the dropping of the organic silicon compound and the nitrogen-containing alkaline aqueous solution (and after the maturation carried out as necessary), the silica-titania composite oxide particles obtained are in a well-dispersed state substantially without formation of adherent particles and aggregations. In some cases, however, a small amount of coarse independent primary particles having a particle size of greater than 5 μm are mixed among the silica-titania composite oxide particles due to a local excessive progress of the reaction. In order to remove such coarse particles and more reliably obtain the powder of the present invention, it is also preferable to carry out filtering in which the aqueous dispersion liquid is filtered with a sieve after completion of the above step and prior to solid-liquid separation (described below).

In the filtering, contrary to solid-liquid separation, particles to be produced need to be let pass, and it is thus necessary to use a sieve having a mesh size at least greater than the average particle size. Preferably, the mesh size of the sieve is greater than the average particle size by 1.5 times to 2 times or more. From the viewpoint of removing coarse particles having a particle size of not less than 5 μm, the mesh size is preferably not more than 5 μm.

In the production method of the present invention, the silica-titania composite oxide particles obtained by the method described above and dispersed in the aqueous dispersion liquid are separated from the aqueous dispersion liquid.

The separation can be achieved by a known method such as: a method of evaporating a solvent away to separate an evaporation residue containing the particles; a method of sedimenting the particles by centrifugal force and gravity, and then removing the supernatant to obtain a concentrate containing the particles; and a method of passing a particle dispersion through a filtering material to obtain a concentrate containing the particles caught on the filtering material.

Further, it is preferable to use a method in which the above methods are combined, for example, a method in which a filtering material is set on a centrifugal container, and a solution that has passed the filtering material by centrifugal force is removed to obtain a concentrate containing the particles on the filtering material.

Further, in order to facilitate the operation of solid-liquid separation, it is possible to use in combination a method of introducing a coagulant, such as ammonium carbonate, into a particle dispersion to form mild aggregates to promote precipitation or improve filterability.

In the production method of the present invention, it is necessary to fire the silica-titania composite oxide particles recovered by the above solid-liquid separation step. To ensure safety during the firing or to increase the efficiency, it is preferable to dry the silica-titania composite oxide particles before firing.

The method of drying is not particularly limited, and can be stationary drying, air-blowing drying, reduced-pressure drying, or the like.

Although a drying temperature depends on the composition of a solvent used, the drying is preferably carried out under a condition of a temperature not lower than the boiling point of the solvent. At atmospheric pressure, the drying temperature is preferably 80° C. to 200° C. A drying time is not particularly limited, but is preferably approximately 2 hours to 48 hours. Carrying out such drying makes it possible to obtain a dried product in powder form.

In the production method of the present invention, various components remaining in the particles which have been subjected to the drying step are removed, and firing is carried out in order to densify the core made of the silica-titania composite oxide and the silica coating layer. At this time, it is essential that the firing temperature be not lower than 900° C. In a case where the firing temperature is lower than 900° C., it is not possible to reduce the water absorption rate sufficiently. This is presumably because the silica coating layer is not dense when formed at a firing temperature lower than 900° C. In terms of easily lowering the water absorption rate, the firing temperature is preferably not lower than 930° C., more preferably not lower than 950° C., and even more preferably not lower than 980° C.

However, an excessively high firing temperature tends to cause sintering of particles to each other and thus increase coarse particles. The coarse particles can be removed by dispersing the coarse particles into a solvent and carry out filtering again. However, such an operation increases production costs due to an increased number of steps. As such, the firing temperature is preferably not higher than 1100° C. and more preferably not higher than 1070° C.

The firing can be carried out by a known method. Generally, it is preferable to use a method in which a container containing dry powder covering a bottom of the container is put in a furnace at a desired temperature.

A length of firing time is not particularly limited, provided that the foregoing objective of the firing is achieved. However, an excessively long firing time reduces productivity. As such, it is enough to increase the temperature up to an intended firing temperature, and then carry out firing at the firing temperature for 0.5 hours to 48 hours, more preferably for 2 hours to 24 hours.

There is no particular restriction on an atmosphere under which the firing is carried out. The firing can be carried out in an inert gas such as argon or nitrogen, or in an air atmosphere.

The powder of the present invention can be produced in the manner described above, but in some cases, the particles are weakly aggregated as a result of firing. As such, the powder may be subjected to crushing, as needed, before being provided to a user and the like.

Further, in a case of carrying out a surface treatment with use of various treatment agents, a known method may be appropriately selected and carried out.

The following description will discuss the present invention in detail based on Examples of the present invention. Note, however, that the present invention is not limited to such Examples.

In the Examples and Comparative Examples below, evaluation was made with respect to physical properties in accordance with the following evaluation methods.
(Volume-Based Cumulative 50% Diameter (Average Particle Size) and Coefficient of Variation)
Before Silica Coating Step From an aqueous dispersion liquid containing silica-titania composite oxide particles, 1 ml was taken and subjected to centrifugation. Then, a supernatant was discarded, 30 ml of water was added, and the silica-titania composite oxide particles were dispersed with use of an ultrasonic homogenizer (Sonifier 250, manufactured by BRANSON) under conditions of 40 W and 10 minutes. Subsequently, a volume-based cumulative 50% diameter (μm) was measured by a laser diffractometry particle size distribution measuring device (LS-230, manufactured by Beckman Coulter, Inc.).

After Firing Step and Surface Treatment Step

Approximately 0.1 g of silica-titania composite oxide powder was weighed out in a 50-mL glass bottle with use of an electronic scale. Approximately 40 g of distilled water (or ethanol in an example experiment involving a surface treatment step after firing) was added, and the silica-titania composite oxide powder was dispersed with use of an ultrasonic homogenizer (Sonifier 250, manufactured by BRANSON) under conditions of 40 W and 10 minutes. Subsequently, a volume-based cumulative 50% diameter (μm) and a coefficient of variation of the silica-titania composite oxide powder were measured with use of a laser diffractometry particle size distribution measuring device (LS-230, manufactured by Beckman Coulter, Inc.).
($Tio_2$ Ratio)

$TiO_2$ ratio is a value calculated from amounts of an organic silicon compound and an organic titanium compound used in a particle producing step and a silica coating step, on the assumption that all of the organic silicon compound and the organic titanium compound were converted into silica-titania particles.
(Confirmation of Amorphousness)

Amorphousness was confirmed in a case where only a broad halo pattern was detected in measurement carried out with use of an X-ray diffraction instrument (Smart Lab, manufactured by Rigaku Corporation) under conditions of a scanning diffraction angle in a range of 10° to 90° and a scanning speed of 2°/min.
(Refractive Index)

A refractive index of silica-titania composite oxide particles was measured by immersion method. Specifically, first, solvents (e.g., toluene, 1-bromonaphthalene, 1-chloronaphthalene, diiodomethane, diiodomethane containing sulfur, and the like) differing in refractive index were blended as appropriate to prepare a plurality of mixed solvents differing from each other in refractive index in increments of 0.005. Next, 0.2 g of the particles was added to 10 mL of each mixed solvent, and the particles were dispersed by an ultrasonic homogenizer (Sonifier 250, manufactured by BRANSON) under conditions of 20 W and one minute to prepare a dispersion. The dispersions were visually compared at 25° C. in terms of transparency. A refractive index of a mixed solvent used in a dispersion having the highest transparency was regarded as the refractive index of the particles. Note that refractive indices of the mixed solvents were measured by an Abbe refractometer at 25° C. using light having a wavelength of 589 nm.
(Water Absorption Rate)

Silica-titania composite oxide powder after a firing step was dried in an atmospheric air at 110° C. for 12 hours, and powder thus dried was stored for 24 hours under conditions of a temperature of 25° C. and a relative humidity of 85% so as to absorb moisture. A water absorption rate was calculated from a change in mass at this time in accordance with the following formula:

$$\text{Moisture absorption rate} = (Y-X)/X \times 100$$

where X is a mass before moisture absorption, and Y is a mass after the moisture absorption.
(Amount of Coarse Particles of not Less than 5 μm in Coulter Counter Method)

Five 50-mL glass bottles were provided. In each of the bottles, 1 g of silica-titania composite oxide powder was weighed out with use of an electronic scale. 19 g of distilled water or ethanol was added, and the silica-titania composite oxide powder was dispersed under conditions of 40 W and 10 minutes with use of an ultrasonic homogenizer (Sonifier 250, manufactured by BRANSON) to prepare a sample to be measured. Particle sizes of the individual silica-titania composite oxide particles in each sample were measured by a Coulter Counter (Multisizer III manufactured by Beckman Coulter, Inc.) with use of an aperture diameter of 20 µm (for a particle size of 0.4 µm to 0.6 µm) or 30 µm (for a particle size of not less than 0.6 µm). At this time, the number of measured particles per sample was approximately 50,000, and a total of approximately 250,000 particles were measured for 5 samples. Among these particles, the number of particles having a particle size of not less than 5 µm was calculated, and each of these calculated numbers was regarded as an amount (ppm) of coarse particles relative to the total number of measured particles.

(Particle Hardness)

Measurement was carried out using a microcompression tester (MZCT-W510-J) manufactured by Shimadzu Corporation. An ethanol dispersion liquid having a particle concentration of 0.02% was prepared, and a droplet of the ethanol dispersion liquid was dropped on a lower pressure plate with use of a dropper and was dried naturally. A load was applied to one particle on the lower pressure plate with use of an upper pressure indenter (a flat indenter made of diamond) having a diameter of 20 µm, and an amount of deformation of the particle was automatically measured. A load rate was 40 mN/sec, a maximum test force was 15 mN, and a retention time was 5 sec. A crushing test force P (mN) and a compressive displacement Z (µm) when the particle fractured were measured. Six particles of 1 µm were randomly selected and measured with use of a microscope attached to the tester, and an average values thus measured was used to calculate a compressive elastic modulus K value (MPa) in accordance with the following formula:

$$K \text{ value (MPa)}=3 \times P/Z^{3/2}/D^{1/2} \times 1000$$

where P is a crushing test force (mN), Z is a compressive displacement (µm), and D is a particle size (µm).

Abbreviations for the raw materials used are as follows.

TMOS: tetramethoxysilane (ortho-methyl silicate, manufactured by TAMA CHEMICALS CO., LTD.)

TPT: titanium tetraisopropoxide (A-1, manufactured by Nippon Soda Co., Ltd.)

IPA: isopropyl alcohol

HMDS: hexamethyldisilazane

Reference Example 1

Into a 10-L four-necked glass flask, 3706 g of TMOS was introduced, and 1853 g of methanol was added as an organic solvent. A resultant mixture was stirred at room temperature for 20 minutes.

In a 10-L five-necked separable glass flask (which was 22 cm in diameter and cylindrical) with a jacket, a baffle plate and a full zone wing (wing diameter: 12 cm) were set, and 333 g of methanol and 83 g of 25 mass % ammonia water were introduced as a reaction solution, and were maintained at 40° C. and stirred. To this liquid, the above alkoxide solution and 2180 g of 25 mass % ammonia water were independently added dropwise. At the start of the dropping, the alkoxide solution and the ammonia water were supplied into the reaction medium at a rate of 2.0 g/min and 0.8 g/min, respectively, and then the supply amounts were gradually increased. The supply of the raw materials completed in 7 hours, and silica particles were grown. After completion of the dropping, maturation was carried out for 30 minutes.

A slurry thus obtained was transferred to a 10-L polyethylene container through a polypropylene filter having a mesh size of 5 µm. To this, 20 g of dry ice (solid carbon dioxide) was introduced, and then the slurry was left to sit for 3 hours.

After the slurry was left to sit for 3 hours, a sediment of silica particles was observed. Quantitative filter paper (retained particle size: 5 µm) was used to carry out filtration under reduced pressure to obtain 2442 g of a concentrate. The filtrate was transparent, and no filtration leakage was observed.

The obtained silica particles were dried in vacuum at 100° C. for 16 hours to obtain 1542 g of silica.

Further, firing was carried out at 900° C. for 12 hours at a heating rate of 5° C./min. A firing atmosphere was not particularly adjusted, and the firing was carried out in an air atmosphere. After the firing, there was no sign of sintering, and 1465 g of silica powder was obtained.

The obtained silica powder had an average particle size of 1.00 µm, a coefficient of variation of 32%, a refractive index of 1.45, and a water absorption rate of 0.0%. An amount of coarse particles of not less than 5 µm in the silica powder was <4 ppm as measured by Coulter counter method.

Example 1

Into a 3-L four-necked glass flask, 942 g of TMOS was introduced as a metal alkoxide, and 235 g of methanol as an organic solvent and 39 g of 0.035 mass % hydrochloric acid as an acid catalyst were added. A resultant mixture was stirred at room temperature for 20 minutes to hydrolyze TMOS. Then, a solution in which 153 g of TPT as a metal alkoxide was diluted with 153 g of IPA was added to obtain a transparent complex alkoxide solution (raw material to be dropped).

In a 5-L five-necked separable glass flask (which was 15 cm in diameter and cylindrical) with a jacket, a baffle plate and a full zone wing (wing diameter: 8 cm) were set, and 300 g of IPA and 75 g of 25 mass % ammonia water were introduced as a reaction solution, and were maintained at 30° C. and stirred (initially introduced raw materials). To this liquid, the above complex alkoxide solution and 519 g of 25 mass % ammonia water were independently added dropwise. At the start of the dropping, the complex alkoxide solution and the ammonia water were supplied into the reaction medium at a rate of 2.0 g/min and 0.6 g/min, respectively, and then the supply amounts were gradually increased. The supply of the raw materials completed in 4 hours, and silica-titania composite oxide particles were grown.

The liquid containing the particles after the completion of the raw materials had a water concentration of 10.0% as calculated from (i) a value obtained by subtracting, from a total amount of water used (an amount of water in the hydrochloric acid and in the ammonia water), an amount of water consumed when the complex alkoxide was completely hydrolyzed and (ii) a theoretical total weight of the slurry.

After completion of the dropping, maturation was carried out for 30 minutes. The silica-titania composite oxide particles in the dispersion liquid had an average particle size of 0.64 µm.

Into a 3-L four-necked glass flask, 101 g of TMOS was introduced, and 25 g of methanol was added as an organic solvent. A resultant mixture was stirred at room temperature for 5 minutes. Note that a thickness of a silica coating layer calculated from a particle size before coating, the number of particles before the coating, and the above amount of TMOS is 10 nm.

To the above aqueous dispersion liquid of the silica-titania composite oxide particles having a liquid temperature adjusted to 45° C., the above TMOS solution and 56 g of 25 mass % ammonia water were independently added dropwise under the following conditions so that a change in water concentration in the liquid containing the particles was not greater than ±1% by mass. The TMOS solution and the ammonia water were supplied into the reaction medium at a rate of 5.0 g/min and 2.2 g/min, respectively, and the supply of the raw materials completed in 25 minutes.

The aqueous dispersion liquid containing the particles after the completion of the raw materials had a water concentration of 10.0% as calculated taking account of contribution of all dropped components, on the assumption that the dropped TMOS was completely hydrolyzed and consumed water.

After completion of the dropping, maturation was carried out for 30 minutes. A ratio of $TiO_2$ is 7.2 mol % as calculated from the raw materials used in steps including this silica coating step.

A slurry thus obtained was transferred to a 10-L polyethylene container through a polypropylene filter having a mesh size of 5 μm. To this, 20 g of dry ice (solid carbon dioxide) was introduced, and then the slurry was left to sit for 3 hours.

After the slurry was left to sit for 3 hours, an aggregated sediment of silica-titania composite oxide particles was observed. Quantitative filter paper (retained particle size: 5 μm) was used to carry out filtration under reduced pressure to obtain 762 g of a concentrate. The filtrate was transparent, and no filtration leakage was observed.

The obtained silica-titania composite oxide particles were dried in vacuum at 100° C. for 16 hours to obtain 508 g of a silica-titania composite oxide.

Further, firing was carried out at 900° C. for 12 hours at a heating rate of 5° C./min. A firing atmosphere was not particularly adjusted, and the firing was carried out in an air atmosphere. After the firing, there was no sign of sintering, and 454 g of silica-titania composite oxide powder was obtained.

Evaluation results of physical properties of the obtained silica-titania composite oxide powder are shown in Table 2.

Examples 2 Through 4

Silica-titania composite oxide particles were obtained in the same manner as in Example 1, except that the firing temperature in Example 1 was changed as shown in Table 2. Evaluation results of physical properties are shown together in Table 2.

TABLE 1

|  |  |  | Reference Example 1 | Examples 1-4 | Comparative Examples 1-4 |
|---|---|---|---|---|---|
| Core particle producing step | Dropped raw material | TMOS [g] | 3706 | 942 | 1034 |
|  |  | Methanol [g] | 1853 | 235 | 259 |
|  |  | 0.035% hydrochloric acid [g] | — | 39 | 43 |
|  |  | TPT [g] | — | 153 | 168 |
|  |  | IPA [g] | — | 153 | 168 |
|  |  | 25% ammonia water [g] | 2180 | 519 | 572 |
|  | Initially introduced raw material | MeOH [g] | 333 | — | — |
|  |  | IPA [g] | — | 300 | 300 |
|  |  | 25% ammonia water [g] | 83 | 75 | 75 |
| Silica coating step | Dropped raw material | TMOS [g] | — | 101 | — |
|  |  | Methanol [g] | — | 25 | — |
|  |  | 25% ammonia water [g] | — | 56 | — |
|  |  | Temperature [° C.] | — | 45 | — |
|  | Water concentration in dispersion liquid | At start of dropping [% by mass] |  | 10.0 |  |
|  |  | At completion of dropping [% by mass] |  | 10.0 |  |
|  |  | Coating thickness [nm] |  | 10 | 0 |

TABLE 2

| | | | Physical properties of particles | | | | |
|---|---|---|---|---|---|---|---|
| | Firing temperature [° C.] | TiO2 concentration [mol %] | Form | Average particle size [μm] | Coefficient of variation [%] | Refractive index | Water absorption rate [%] | Coarse particles ≥5 μm [ppm] |
|---|---|---|---|---|---|---|---|---|
| Reference Example 1 | 900 | 0 | Amorphous | 1.00 | 32 | 1.45 | 0.0 | <4 |
| Example 1 | 900 | 7.2 | Amorphous | 0.63 | 14 | 1.49 | 0.6 | <4 |
| Example 2 | 950 | 7.2 | Amorphous | 0.63 | 14 | 1.49 | 0.3 | <4 |
| Example 3 | 1000 | 7.2 | Amorphous | 0.63 | 14 | 1.49 | 0.1 | <4 |
| Example 4 | 1050 | 7.2 | Amorphous | 0.63 | 14 | 1.49 | 0.1 | 6 |
| Comparative Example 1 | 900 | 8.0 | Amorphous | 0.63 | 14 | 1.50 | 4.1 | 5 |
| Comparative Example 2 | 950 | 8.0 | Amorphous | 0.63 | 14 | 1.50 | 1.5 | 12 |
| Comparative Example 3 | 1000 | 8.0 | Amorphous | 0.63 | 14 | 1.50 | 1.2 | 25 |
| Comparative Example 4 | 1050 | 8.0 | Amorphous | 0.68 | 27 | 1.50 | 1.2 | 62 |

Comparative Example 1

Silica-titania composite oxide particles were obtained in the same manner as in Example 1 (firing temperature: 900° C.), except that the particle producing step was conducted with use of raw materials in the amounts shown in Table 1, and the silica coating step was not conducted.

The obtained silica-titania composite oxide powder was amorphous and had a $TiO_2$ ratio of 8.0 mol %, an average particle size of 0.63 µm, a coefficient of variation of 14%, a refractive index of 1.50, and a water absorption rate of 4.1%. An amount of coarse particles of not less than 5 µm in the silica powder was 5 ppm as measured by Coulter counter method.

Comparative Examples 2 Through 4

Silica-titania composite oxide particles were obtained in the same manner as in Comparative Example 1, except that the firing temperature in Comparative Example 1 was changed as shown in Table 2. Evaluation results of physical properties are shown together in Table 2.

Example 5

Silica-titania composite oxide particles were obtained in the same manner as in Example 3 (firing temperature: 1000° C.), except that the particle producing step and the silica coating step were conducted with use of raw materials in the amounts shown in Table 3. As to initially introduced raw materials not shown in Table 3, 300 g of IPA and 75 g of 25 mass % ammonia water were used as in Example 3. Evaluation results of physical properties are shown in Table 4.

Examples 6 Through 8 and Comparative Examples 5 Through 7

Silica-titania composite oxide particles were obtained in the same manner as in Example 5, except that the particle producing step and the silica coating step were conducted with use of raw materials in the amounts shown in Table 3. Evaluation results of physical properties are shown in Table 4.

TABLE 3

| | Core particle producing step Dropped raw material | | | | | | Silica coating step | | | | | |
| | | | | | | | Dropped raw material | | | Water concentration in dispersion liquid | | Coating thickness [nm] |
| | TMOS [g] | Methanol [g] | 0.035% hydro-chloric acid [g] | TPT [g] | IPA [g] | 25% ammonia water [g] | TMOS [g] | Methanol [g] | 25% ammonia water [g] | Temperature [° C.] | At start of dropping [% by mass] | At completion of dropping [% by mass] | |
|---|---|---|---|---|---|---|---|---|---|---|---|---|---|
| Example 5 | 1015 | 254 | 42 | 165 | 165 | 561 | 21 | 5 | 11 | 45 | 10.0 | 10.0 | 2 |
| Example 6 | 987 | 247 | 41 | 160 | 160 | 545 | 51 | 13 | 28 | 45 | 10.0 | 10.0 | 5 |
| Example 7 | 855 | 214 | 35 | 139 | 139 | 468 | 195 | 49 | 109 | 45 | 10.0 | 10.0 | 20 |
| Example 8 | 774 | 193 | 32 | 126 | 126 | 421 | 284 | 71 | 158 | 45 | 10.0 | 10.0 | 30 |
| Comparative Example 5 | 942 | 235 | 39 | 153 | 153 | 519 | 101 | 25 | — | 45 | 10.0 | 8.5 | 10 |
| Comparative Example 6 | 855 | 214 | 35 | 139 | 139 | 468 | 195 | 49 | — | 45 | 10.0 | 7.0 | 20 |
| Comparative Example 7 | 774 | 193 | 32 | 126 | 126 | 421 | 284 | 71 | — | 45 | 10.0 | 5.5 | 30 |

TABLE 4

| | Silica | | Physical properties of particles | | | | | |
| | coating thickness [nm] | TiO2 concentration [mol %] | Form | Average particle size [µm] | Coefficient of variation [%] | Refractive index | Water absorption rate [%] | Coarse particles ≥5 µm [ppm] |
|---|---|---|---|---|---|---|---|---|
| Example 5 | 2 | 7.9 | Amorphous | 0.63 | 14 | 1.50 | 0.5 | 6 |
| Example 6 | 5 | 7.6 | Amorphous | 0.63 | 14 | 1.50 | 0.1 | 6 |
| Example 3 | 10 | 7.2 | Amorphous | 0.63 | 14 | 1.49 | 0.1 | <4 |
| Example 7 | 20 | 6.5 | Amorphous | 0.63 | 14 | 1.49 | 0.1 | <4 |
| Example 8 | 30 | 5.9 | Amorphous | 0.63 | 14 | 1.48 | 0.0 | <4 |
| Comparative Example 5 | 10 | 7.2 | Amorphous | 0.73 | 25 | 1.49 | 1.2 | 30 |
| Comparative Example 6 | 20 | 6.5 | Amorphous | 0.75 | 27 | 1.49 | 1.2 | 42 |
| Comparative Example 7 | 30 | 5.9 | Amorphous | 0.78 | 33 | 1.48 | 0.9 | 120 |

Examples 9 and 10 and Comparative Examples 8 and 9

Silica-titania composite oxide particles were obtained (a theoretical coating thickness was 10 nm) in the same manner as in Example 3, except that the temperature of the aqueous dispersion liquid in the silica coating step was changed as shown in Table 5. Evaluation results of physical properties are shown together in Table 5.

TABLE 5

| | Temperature of reaction solution [° C.] | Physical properties of particles | | | | | |
|---|---|---|---|---|---|---|---|
| | | TiO2 concentration [mol %] | Form | Average particle size [μm] | Coefficient of variation [%] | Refractive index | Water absorption rate [%] | Coarse particles ≥5 μm [ppm] |
| Example 9 | 40 | 7.2 | Amorphous | 0.65 | 21 | 1.49 | 0.3 | 5 |
| Example 10 | 55 | 7.2 | Amorphous | 0.63 | 14 | 1.49 | 0.1 | <4 |
| Comparative Example 8 | 25 | 7.2 | Amorphous | 0.75 | 28 | 1.49 | 1.2 | 42 |
| Comparative Example 9 | 35 | 7.2 | Amorphous | 0.71 | 25 | 1.49 | 1.0 | 25 |

Example 11

Silica-titania composite oxide particles were obtained in the same manner as in Example 3 (firing temperature: 1000° C.), except that the particle producing step and the silica coating step were conducted with use of raw materials in the amounts shown in Table 6. Note that an assumed thickness of a silica coating layer is 20 nm. Evaluation results of physical properties are shown in Table 7.

Comparative Example 10

Silica-titania composite oxide particles were obtained in the same manner as in Example 11, except that the particle producing step was conducted with use of raw materials in the amounts shown in Table 6, and the silica coating step was not conducted. Evaluation results of physical properties are shown in Table 7.

TABLE 6

| | | | Example 11 | Example 12 | Example 13 | Comparative Example 10 | Comparative Example 11 | Comparative Example 12 |
|---|---|---|---|---|---|---|---|---|
| Core particle producing step | Dropped raw material | TMOS [g] | 2990 | 639 | 604 | 3342 | 685 | 647 |
| | | Methanol [g] | 1495 | 447 | 423 | 1671 | 479 | 453 |
| | | 0.035% hydrochloric acid [g] | 123 | 34 | 50 | 138 | 36 | 54 |
| | | TPT [g] | 486 | 133 | 199 | 543 | 142 | 213 |
| | | IPA [g] | 486 | 133 | 199 | 543 | 142 | 213 |
| | | 25% ammonia water [g] | 1830 | 366 | 354 | 2048 | 393 | 379 |
| | Initially introduced raw material | IPA [g] | 333 | 600 | 600 | 333 | 600 | 600 |
| | | 25% ammonia water [g] | 83 | 150 | 150 | 83 | 150 | 150 |
| Silica coating step | Dropped raw material | TMOS [g] | 382 | 52 | 55 | — | — | — |
| | | Methanol [g] | 96 | 13 | 14 | — | — | — |
| | | 25% ammonia water [g] | 213 | 29 | 30 | — | — | — |
| | | Temperature [° C.] | 45 | 45 | 45 | — | — | — |
| | Water concentration in dispersion liquid | At start of dropping [% by mass] | 10.0 | 10.0 | 10.0 | — | — | — |
| | | At completion of dropping [% by mass] | 10.0 | 10.0 | 10.0 | — | — | — |
| | | Coating thickness [nm] | 20 | 5 | 5 | 0 | 0 | 0 |

TABLE 7

| | Silica coating thickness [nm] | TiO2 concentration [mol %] | Form | Physical properties of particles | | | | | Particle hardness | | |
| --- | --- | --- | --- | --- | --- | --- | --- | --- | --- | --- | --- |
| | | | | Average particle size [μm] | Coefficient of variation [%] | Refractive index | Water absorption rate [%] | Coarse particles ≥5 μm [ppm] | Crushing test force P [mN] | Compressive displacement [μm] | Compressive elastic modulus K [MPa] |
| Example 11 | 20 | 7.1 | Amorphous | 1.01 | 35 | 1.49 | 0.1 | <4 | 3.2 | 0.33 | 50641 |
| Comparative Example 10 | 0 | 80 | Amorphous | 1.01 | 35 | 1.50 | 1.5 | <4 | 2.9 | 0.34 | 43883 |

Examples 12 and 13 and Comparative Examples 11 and 12

Silica-titania composite oxide particles were obtained in the same manner as in Example 3, except that the particle producing step and the silica coating step were conducted with use of raw materials in the amounts shown in Table 7. Evaluation results of physical properties are shown in Table 8.

TABLE 8

| | Silica coating thickness [nm] | Physical properties of particles | | | | | |
| --- | --- | --- | --- | --- | --- | --- | --- |
| | | TiO2 concentration [mol %] | Form | Average particle size [μm] | Coefficient of variation [%] | Refractive index | Water absorption rate [%] | Coarse particles ≥5 μm [ppm] |
| Example 12 | 5 | 9.3 | Amorphous | 0.36 | 15 | 1.51 | 0.0 | <4 |
| Example 13 | 5 | 13.8 | Amorphous | 0.34 | 15 | 1.54 | 0.0 | <4 |
| Comparative Example 11 | 0 | 10.0 | Amorphous | 0.36 | 15 | 1.51 | 1.8 | 48 |
| Comparative Example 12 | 0 | 15.0 | Amorphous | 0.34 | 15 | 1.55 | 1.3 | 64 |

Reference Example 2

100 g of the silica-titania composite oxide particles obtained in Comparative Example 3 were dried in vacuum at 100° C. for 12 hours and then put in a 500-mL pressure container. The inside of the container was replaced with a nitrogen atmosphere, and the container was sealed under an atmospheric pressure. 0.75 g of HMDS was sprayed while the particles were stirred. After raising the temperature from room temperature to 150° C. in one hour, stirring was further continued for 2 hours, and cooling was conducted. The obtained silica-titania composite oxide particles subjected to surface treatment were dried in vacuum at 150° C. for 12 hours. Evaluation results of physical properties are shown in Table 9.

Example 14

The silica-coated silica-titania composite oxide particles obtained in Example 3 were subjected to HMDS treatment in the same manner as in Reference Example 2. Evaluation results of physical properties are shown in Table 9.

TABLE 9

| | Surface treatment step | Physical properties of particles | | | | |
| --- | --- | --- | --- | --- | --- | --- |
| | | Average particle size [μm] | Coefficient of variation [%] | Refractive index | Water absorption rate [%] | Coarse particles ≥5 μm [ppm] |
| Comparative Example 3 | — | 0.63 | 14 | 1.50 | 1.2 | 25 |
| Reference Example 2 | HMDS treatment | 0.68 | 27 | 1.50 | 0.6 | 30 |
| Example 3 | — | 0.63 | 14 | 1.49 | 0.1 | <4 |
| Example 14 | HMDS treatment | 0.63 | 14 | 1.49 | 0.0 | <4 |

The silica-titania composite oxide powders in accordance with Examples 1 through 14 each had a reduced water absorption rate in comparison to the silica-titania composite oxide particles in accordance with Comparative Examples 1 through 12. The silica-titania composite oxide powders in accordance with Examples 1 through 14 each had a reduced amount of coarse particles in comparison to the silica-titania composite oxide particles in accordance with Comparative Examples 2 through 9, 11, and 12. The silica-titania composite oxide powders in accordance with Examples 1 through 14 each made it possible, when a resin or the like was filled with the amorphous silica-titania composite oxide powder for use, to reduce a decrease in transparency of a resin cured product over time and reduce a defect in the resin cured product, in comparison to the silica-titania composite oxide particles in accordance with Comparative Examples 1 through 12.

The invention claimed is:

1. Amorphous silica-titania composite oxide powder which is powder untreated with a surface treatment agent and consisting of amorphous silica-titania composite oxide particles,
wherein:
   a refractive index of the particles as measured by immersion method at a measurement wavelength of 589 nm is not less than 1.46;
   a volume-based cumulative 50% diameter as measured by laser diffractometry is in a range of 0.1 μm to 2.0 μm; and
   a content of particles having a particle size of not less than 5.0 μm is not more than 10 ppm as measured by Coulter counter method, and
wherein, in a case where the silica-titania composite oxide powder is dried in an atmospheric air at 110° C. for 12 hours, and powder thus dried is stored for 24 hours under conditions of a temperature of 25° C. and a relative humidity of 85% so as to absorb moisture, a water absorption rate is not more than 0.8% by mass as calculated from a change in mass in accordance with the following formula:

water absorption rate=$(Y-X)/X \times 100$ where X is a mass before moisture absorption, and Y is a mass after the moisture absorption.

2. The amorphous silica-titania composite oxide powder as set forth in claim 1, including:
   a core consisting of a silica-titania composite oxide; and
   a silica coating layer consisting of silica.

3. Surface-treated amorphous silica-titania composite oxide powder in which amorphous silica-titania composite oxide powder recited in claim 1 has been treated with a surface treatment agent.

4. A resin composition, comprising:
   amorphous silica-titania composite oxide powder recited in claim 1; and
   a resin.

5. A dispersion liquid in which amorphous silica-titania composite oxide powder recited in claim 1 is dispersed in a solvent.

* * * * *